(12) United States Patent
Tailor et al.

(10) Patent No.: US 8,840,977 B2
(45) Date of Patent: Sep. 23, 2014

(54) CASING MEMBER FOR FORMING A CONNECTION BETWEEN TUBULAR SECTIONS AND USE THEREOF FOR FORMING CONNECTIONS

(75) Inventors: Dilip Tailor, Mississauga (CA); Ronald J. Dunn, Oakville (CA); Pascal Laferriere, Toronto (CA); Aaron Klejman, Toronto (CA)

(73) Assignee: ShawCor Ltd., Toronto, Ontario (CA)

( * ) Notice: Subject to any disclaimer, the term of this patent is extended or adjusted under 35 U.S.C. 154(b) by 0 days.

(21) Appl. No.: 13/698,869

(22) PCT Filed: May 17, 2011

(86) PCT No.: PCT/CA2011/050309
§ 371 (c)(1),
(2), (4) Date: May 2, 2013

(87) PCT Pub. No.: WO2011/143773
PCT Pub. Date: Nov. 24, 2011

(65) Prior Publication Data
US 2013/0228265 A1    Sep. 5, 2013

(30) Foreign Application Priority Data

May 19, 2010   (CA) ..................................... 2704406

(51) Int. Cl.
| | | |
|---|---|---|
| *B29D 22/00* | (2006.01) | |
| *B29D 23/00* | (2006.01) | |
| *B32B 1/08* | (2006.01) | |
| *F16L 47/22* | (2006.01) | |
| *B29C 65/00* | (2006.01) | |
| *F16L 59/20* | (2006.01) | |
| *F16L 13/00* | (2006.01) | |
| *F16L 47/03* | (2006.01) | |
| *B29C 65/34* | (2006.01) | |
| *B29C 65/14* | (2006.01) | |
| *B29L 23/00* | (2006.01) | |
| *B29C 65/10* | (2006.01) | |
| *B29C 65/36* | (2006.01) | |

(52) U.S. Cl.
CPC .......... *F16L 13/004* (2013.01); *B29C 65/3444* (2013.01); *F16L 47/22* (2013.01); *B29C 65/1412* (2013.01); *B29L 2023/225* (2013.01); *B29C 66/53241* (2013.01); *B29C 65/34* (2013.01); *B29C 66/727* (2013.01); *B29C 66/723* (2013.01); *B29C 65/348* (2013.01); *B29C 65/10* (2013.01); *B29C 65/344* (2013.01); *B29C 66/72321* (2013.01); *B29C 66/73715* (2013.01); *B29C 66/73751* (2013.01); *F16L 59/20* (2013.01); *B29C 65/342* (2013.01); *B29C 66/4322* (2013.01); *B29C 65/3612* (2013.01); *F16L 47/03* (2013.01); *B29C 66/73753* (2013.01); *B29C 65/3476* (2013.01); *B29C 65/36* (2013.01); *B29C 66/348* (2013.01)
USPC ..... 428/36.91; 428/36.9; 428/35.7; 285/21.2; 285/45

(58) Field of Classification Search
CPC .......... F16L 47/03; F16L 13/10; F16L 47/22; F16L 59/20; B29C 65/02; B29C 65/34; B29D 22/00; B29D 23/00; B32B 1/08; B32B 27/08
USPC .............. 428/35.7, 36.9, 36.91; 285/21.2, 45
See application file for complete search history.

(56) References Cited

U.S. PATENT DOCUMENTS

| | | | |
|---|---|---|---|
| 4,252,849 | A | 2/1981 | Nishimura et al. |
| 4,728,550 | A | 3/1988 | Van Beersel |
| 5,988,689 | A | 11/1999 | Lever |
| 6,215,107 | B1 | 4/2001 | Merle |
| 6,245,174 | B1 | 6/2001 | Cordia et al. |
| 6,355,318 | B1 | 3/2002 | Tailor et al. |
| 2003/0209904 | A1 | 11/2003 | Harget |

FOREIGN PATENT DOCUMENTS

| | | |
|---|---|---|
| WO | WO8403346 | 8/1984 |
| WO | WO9628683 | 9/1996 |

*Primary Examiner* — Michael C Miggins

(74) *Attorney, Agent, or Firm* — DeLio, Peterson & Curcio, LLC; Peter W. Peterson

(57) ABSTRACT

A casing member for forming a connection between two tubular sections, said casing member having a first, cross-linked, heat shrinkable plastic layer, and a second, inner, non-crosslinked (or less cross-linked) layer. The casing member also has an electrically heatable member spaced inwardly from the first layer, for fusion bonding the second layer to the tubular sections.

19 Claims, 6 Drawing Sheets

CASING MEMBER FOR FORMING A CONNECTION BETWEEN TUBULAR SECTIONS AND USE THEREOF FOR FORMING CONNECTIONS

CROSS-REFERENCE TO RELATED APPLICATION

This application claims the benefit of, and priority, to Canadian Application No. 2,704,406, filed May 19, 2010 under the title "CASING MEMBER FOR FORMING A CONNECTION BETWEEN TUBULAR SECTIONS AND USE THEREOF FOR FORMING CONNECTIONS". The content of the above-noted patent application is hereby expressly incorporated by reference into the detailed description hereof.

The present invention relates to casing members for forming a connection between tubular sections. Such members may be used for connecting a variety of tubular sections together, for example they may be used as coupling sleeves for joining plastic tubes or pipes. In one preferred form, the members are used for forming a connection between the casings of preinsulated pipes in the course of forming a joint between preinsulated pipe sections.

Known casing members of which the applicant is aware, for example as described in U.S. Pat. No. 4,629,216 published Dec. 16, 1986, have comprised non-shrink plastic casings and have employed electric heating elements to form a bond between the plastic casing and the plastic jacket of preinsulated pipes. These have provided connections which may not be considered adequate in all circumstances, particularly where the tubular sections to be joined or the casings have been deformed out of the circular cross-section, for example as a result of damage during transport or storage, or are otherwise out of round, and thus are non-concentric. Further, the quality of the connection between the material of the casing member and the material of the outer surface of the tubular section may not reach such standards as may be considered desirable in some circumstances.

U.S. Pat. No. 4,866,252 (Van Loo et al) published Sep. 12, 1989, discloses a connection between preinsulated pipes having a casing and sleeve articles, one disposed over each end of the casing where it overlaps the jacket of the preinsulated pipe. The articles have a bonding material that will form a fusion bond to the jacket, an outer heat shrink layer and a built in electrical heating element in contact with the heat shrink layer for heating and shrinking the outer layer. Since the heat flux from the built in heating element is relatively small, the heat shrink layers are made thin to permit heat penetration and shrinking of the heat shrink layer, and according to the patent the thickness of the article before heat shrinking may be up to 6 mm. The article is less useful where thicker casing members are desired for use with large diameter preinsulated pipes.

In one preferred aspect, the present invention provides a casing member for forming a connection between two tubular sections, the casing member having at each side a side portion for connecting on a respective adjacent end surface of a tubular section adjacent the connection, and a middle portion that spans between the end surfaces of the tubular sections, each said side portion comprising a first crosslinked plastics material layer to be disposed relative to said end surfaces outwardly from a second plastics material layer that is uncrosslinked or has a degree of crosslinking substantially less than said first layer, at least said first layer being heat shrinkable at the circumference of the adjacent tubular section, and an electrically heatable member spaced inwardly from said first layer and for heating the second layer to cause it to fusion bond with a plastics material jacket of a tubular section when disposed adjacent thereto.

The first layer of the above casing member is adapted to be heat shrunk with an external heat source and as such may be of substantial thickness. In the preferred form, the casing thickness before heat shrinking at its portion of greatest wall thickness may be about 2 to 25 mm, more typically 2 to 15 mm. It is an advantage of the preferred structure that for use with large diameter tubular sections, for example greater than 560 mm diameter, said casing thickness may be 8 to 25 mm.

In use, when the first layer of the casing member is heat shrunk, in one preferred form it applies a hoop stress to the second layer. When the second layer is heated with the electrically heatable members, in a preferred form, a fusion bond is created between the material of the second layer and of the outer surface of the tubular section. As is well known by those skilled in the art, a fusion bond is created when two compatible plastics materials melt and fuse together under fusion or welding conditions. A fusion bond results in a continuously homogeneously weld portion. The above-mentioned hoop stress facilitates formation of the fusion bond.

By way of contrast to the above described fusion bond, it may be mentioned that when a heated adhesive material is used to bond an element such as a casing member to a substrate such as the outer surface of the tubular section, a bond of somewhat lesser quality is achieved. In the adhesive bond, the substrate to which the adhesive material is applied does not necessarily melt, and, after cooling, a distinct interface remains between the adhesive material and the substrate.

In a preferred form of the present invention, the hoop stress generated by the shrunk first layer can result in an especially high quality fusion bond between the second layer and the surface of the tubular section.

The use of an electrically heatable member is a particularly effective and convenient way of heating the second layer and the tubular section surface substrate to create the fusion bond. The electrically heatable member, may for example, be in the form of electrical resistance heating elements or electrically inductively heatable elements which may be disposed inwardly from the second layer, or may be disposed integrally within the second layer.

In use, in a preferred form, a heat source external of the casing member, such as a conventional heating torch, heating blanket or infrared heater, is applied to the first layer to cause the sides of the casing to shrink down tightly on the underlying overlapped portions of the tubular sections. The shrink down portions conform closely to the profile of the tubular sections eliminating any gapping that might, in the case of a non-shrinkable structure, result from non-concentricity between the casing member and the tubular sections.

Whereas the Van Loo et al U.S. Pat. No. 4,866,252 discloses two separate wrap-around sleeve articles, one disposed over each end of the casing where it overlaps the jacket of the preinsulated pipe, in a preferred form of the present invention the casing member spans continuously between the two tubular sections and the middle portion is formed integrally with the side portions, and hence is of relatively simple construction and may be more economic and less time consuming to install in some circumstances.

The invention will be more fully described by way of example only with reference to the accompanying drawings.

Like reference numerals in the drawings indicate like parts.

Figure 1:
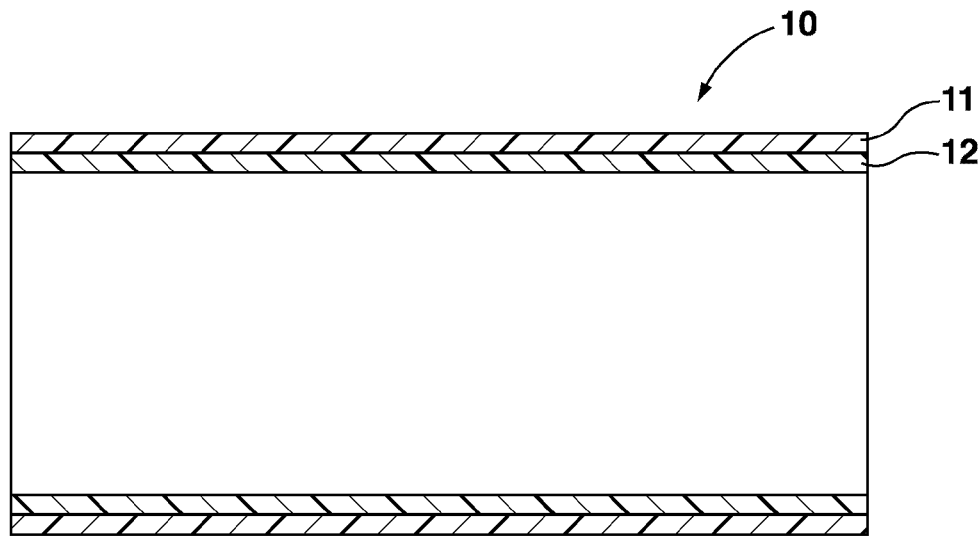
FIGS. 1, 2 and 3 show somewhat schematically longitudinal cross-sections through tubular casing members in accordance with preferred forms of the present invention.

FIG. 1 shows a tubular casing member 10 having an outer cylindrical first layer 11 of heat shrinkable crosslinked plastics material and a second or inner cylindrical plastics material layer 12 that is non-crosslinked or is crosslinked to substantially a less degree than the first layer 11. The second layer 12 need not be, but preferably is, heat shrinkable, in order to increase the hoop stress created in the second layer 12 when the casing member is heat shrunk onto a substrate, thereby increasing the quality of the fusion bond with the substrate.

Figure 2:
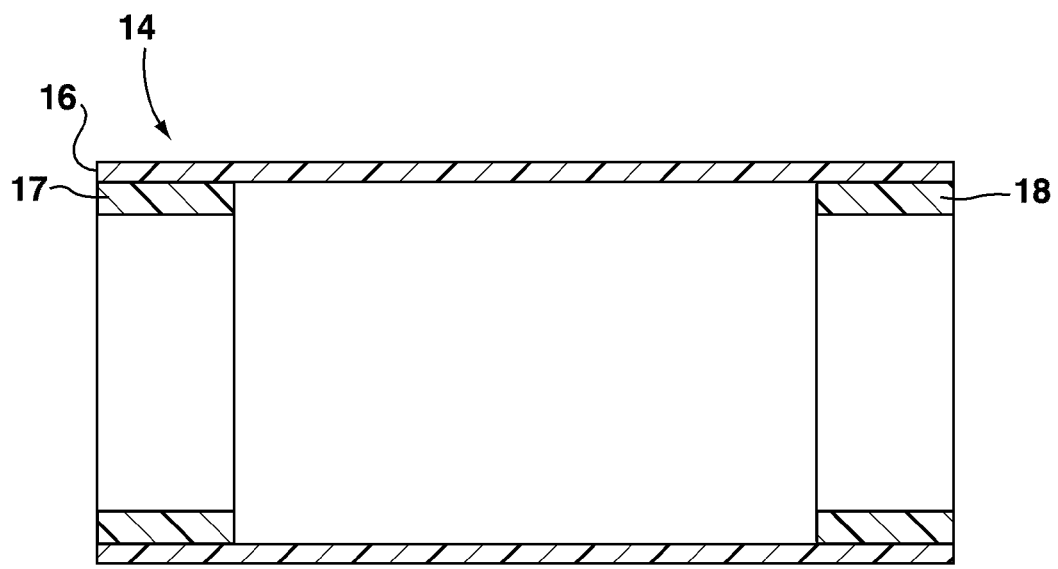

FIG. 2 illustrates a casing member 14 having an outer first layer 16 that is crosslinked and heat shrinkable and discrete second layer portions 17 and 18 that are preferably heat shrinkable, and are non-crosslinked or are crosslinked to a lesser degree than layer 16, extending adjacent the sides of the casing member 14. The middle portion of the casing member 14 is free from the second layer 17 and 18.

Figure 3:
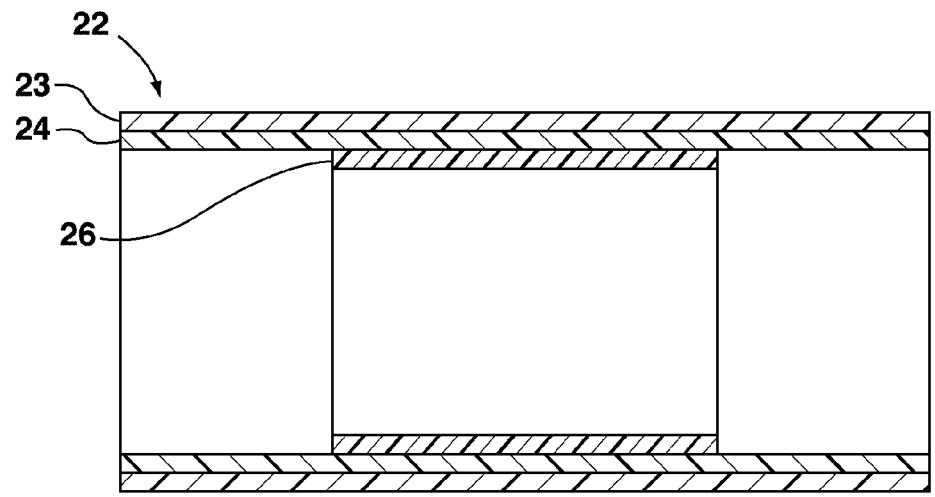

FIG. 3 shows a further casing member 22 having first and second plastics material layers 23 and 24 similar to layers 11 and 12 described above, and a third or inner layer 26 of smaller width than the layers 23 and 24. The inner layer 26 is non-crosslinked, or is crosslinked to a lesser extent than layer 23, and is heat shrinkable.

Figure 4:
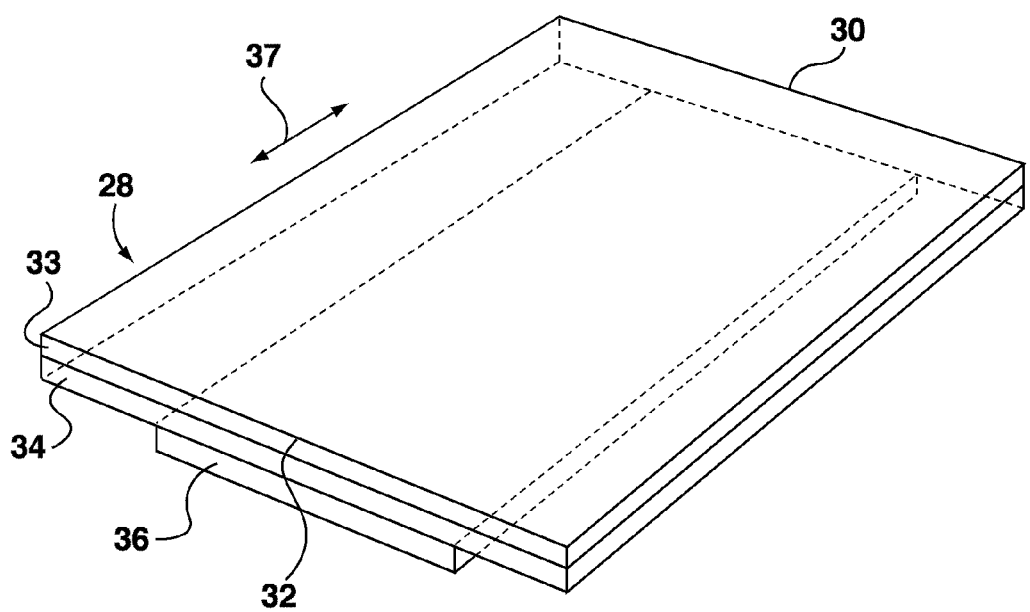
FIG. 4 shows a wraparound sleeve in accordance with one preferred form of the invention.

FIG. 4 shows a wraparound sleeve 28 that may be formed into a tubular casing, similar to the tubular casing of FIG. 3, by connecting its opposed end 30 and 32 together. The sleeve 28 comprises layers 33, 34 and 36 laminated together. These layers have the properties described above in connection with FIG. 3 for layers 23, 24 and 26, respectively. The heat shrinkable layer or layers thereof are heat shrinkable in the direction of the arrow 37.

Plastics materials from which the casing members and wraparound sleeve of FIGS. 1 to 4 may be produced, and the techniques for their production will be readily apparent to one of ordinary skill in the art, and are described in more detail in WO 98/21517, published May 22, 1998, commonly assigned. The disclosures of WO 98/21517 are incorporated in their entirety herein by reference.

FIGS. 5 to 14 illustrate use of the above described casing members, selected to be of appropriate diameter, or casing members formed from appropriate lengths of wraparound sleeve members, for enclosing and forming a joint between two preinsulated pipe sections 41 and 42. Each pipe section 41 and 42 comprises insulation material, for example polyurethane foam in the form of a cylinder disposed concentrically around a metal, for example steel, pipe 43. The pipes 43 are welded together at a weld joint 44. The insulation is jacketed within a cylindrical pipe jacket 46 seen in FIG. 9A.

The plastics material of the second or inner layers of the casing members are selected such that they are compatible with and will form fusion bond with the jacket material 46.

Typically, the inner and outer layers of the casing member as well as the jacket material 46 comprise polyolefin, more typically polyethylene.

Desirably for use with preinsulated pipe of moderate diameter, the casing members 14, 10, 22 and 28 have a thickness of 2 to 15 mm at their thickest wall portion. For larger pipe having a diameter greater than 560 mm, said thickness may preferably be 8-25 mm.

Figure 5:
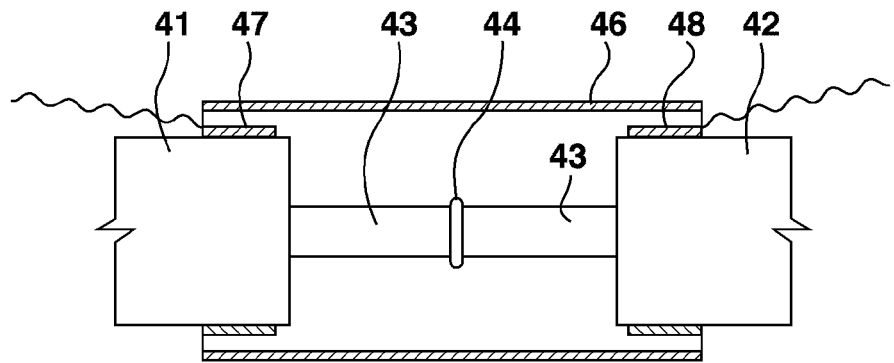
FIGS. 5, 6 and 7 are side views, partially in section through a pipe joint illustrating successive stages in forming a connection according to one preferred form of the invention.
Figure 6:
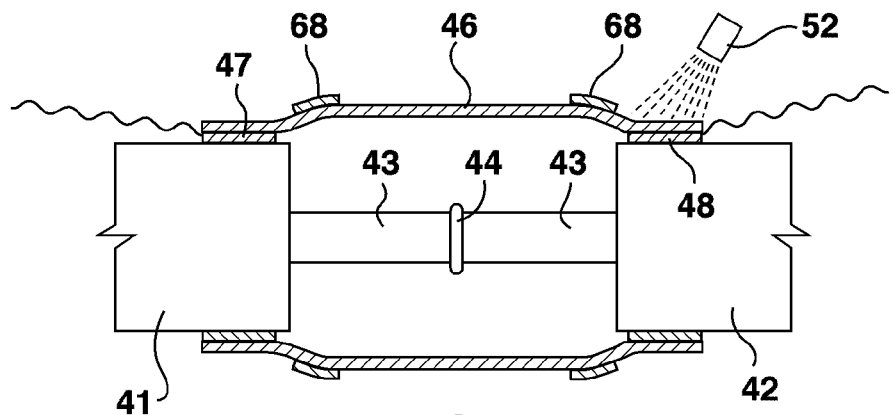
Figure 7:
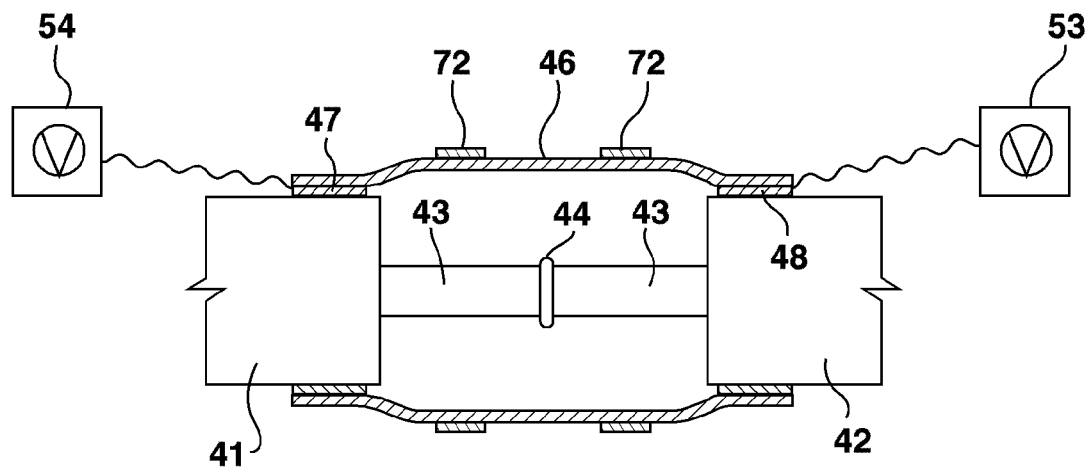

In the example of FIGS. 5 to 7, a casing member 46 similar to casing member 10, 14 or 22 described above is disposed around the pipe joint, overlapping the ends of the jackets of the pipes 41 and 42. Annular electrically heatable members 47 and 48 are disposed on the outer side of the pipe jacket in the overlap region. The electrically heatable members 47 and 48 may be, for example in the form of resistively heatable wire, rods, wire mesh or netting in a tape form, or electric wire or flat metallic strip coated with a polymer compatible with the fusion bonding of the casing second layers to the pipe jackets, for example polyethylene.

Such electrically heatable members are in themselves known for other purposes, and need not be described in detail herein.

The heat shrinkable side portions of the casing member 46 are shrunk by heating from an external source, for example applied from a heating torch 52, or other external heater such as a heating blanket or infrared heater, generating a strong compressive hoop stress between the shrunk down side portions and the pipe jacket. The electrically heatable members 47 and 48 are then energized using power sources 53 and 54 to cause fusion bonding between the non-crosslinked or relatively uncrosslinked second layers of the casing member 46 and the pipe jacket.

Figure 8:
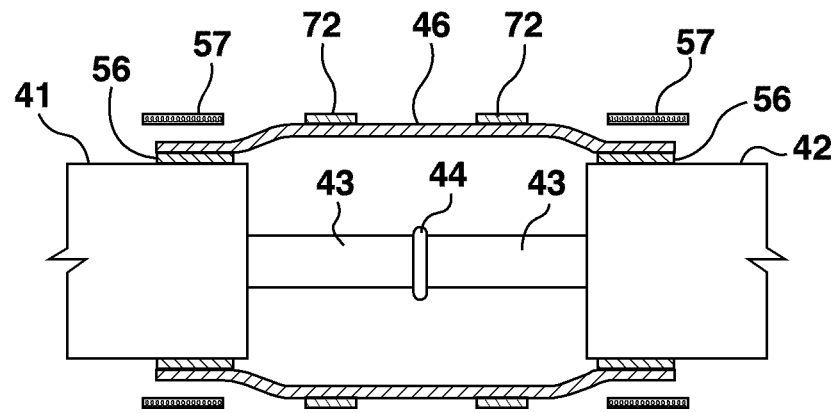
FIGS. 8 and 9 show successive stages in the use of a casing member in accordance with a further preferred form of the invention.

FIG. 8 illustrates a modification in which an electrically heatable member 56 comprises inductively heatable elements, comprising, for example, a fusion compatible polymer, for example polyethylene in tape form filled with a magnetic or metallic filler. Inductively heatable structures usable as the members 56 are available from, for example Emaweld, Norwood, N.J. 07648, U.S.A. In order to heat the electrical heatable member 56, and cause fusion bonding to the pipe jacket, an induction coil 57 is applied around each side of the casing member and is electrically energized.

Following fusion bonding of the shrunk down sides of the casing member 46 to the pipe jacket, the interior of the casing receives a precursor of a foam through a fill hole 58, and the foam 60 is allowed to fully form and cure.

Figure 9:
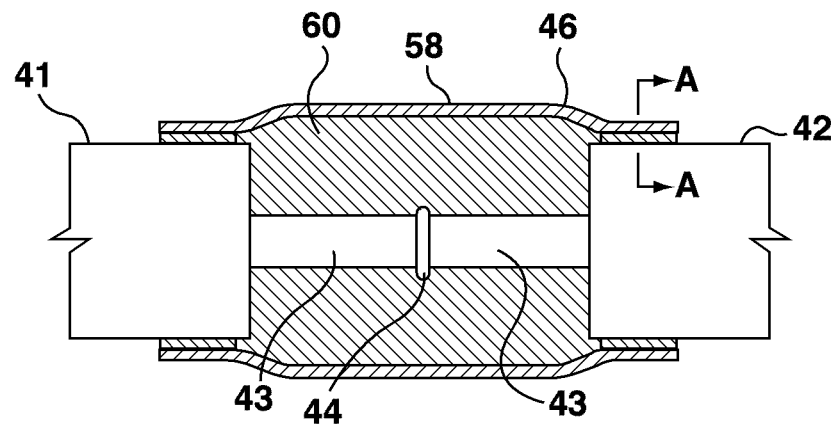
Figure 9A:
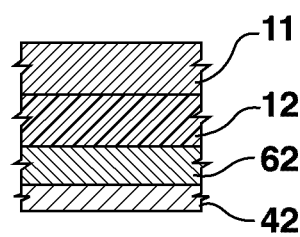
FIG. 9A is a cross-section taken on the line A-A in FIG. 9.

FIG. 9A shows an example of the multiple layers of the side portion of the product, comprising first layer 11, second layer 12 and the residue of polymer 62 comprising the electrically heatable member. In use, all these layers, together with the material of the pipe jacket 46 are fused together, so that the boundaries between the layers, as seen in FIG. 9A, would not be visible.

Figure 10:
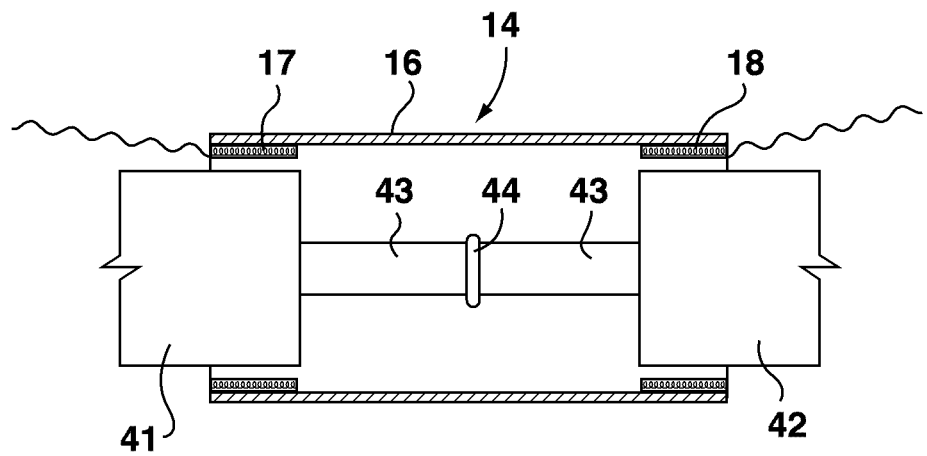
FIGS. 10 and 11 show successive stages in forming a connection in accordance with a further preferred form of the invention.

FIG. 10 shows a further example employing a casing member 14, as seen in FIG. 2, wherein electrically heatable members in the form of resistance heating elements are embedded within the material of the second layer portions 17 and 18. The procedure is otherwise similar to that described above in connection with FIGS. 5 to 7.

The procedure for forming the portions 17 and 18 with embedded heating elements is described in above-mentioned U.S. Pat. No. 4,866,252 and in WO 93/24300 published Dec. 9, 1993 and incorporated for their disclosures in their entirety by reference herein.

Figure 12:
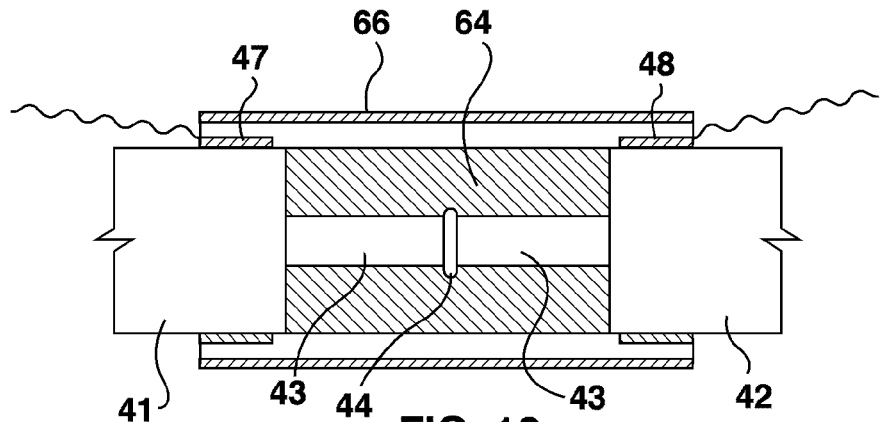
FIGS. 12, 13 and 14 show successive stages using a still further preferred form of the invention.
Figure 13:
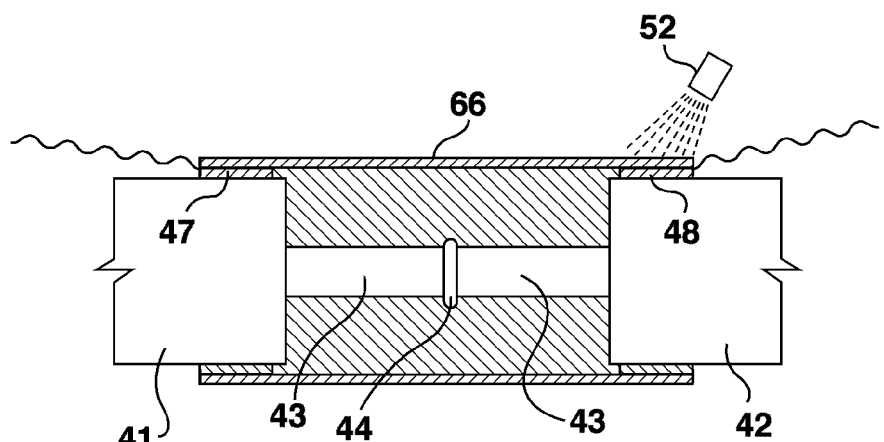
Figure 14:
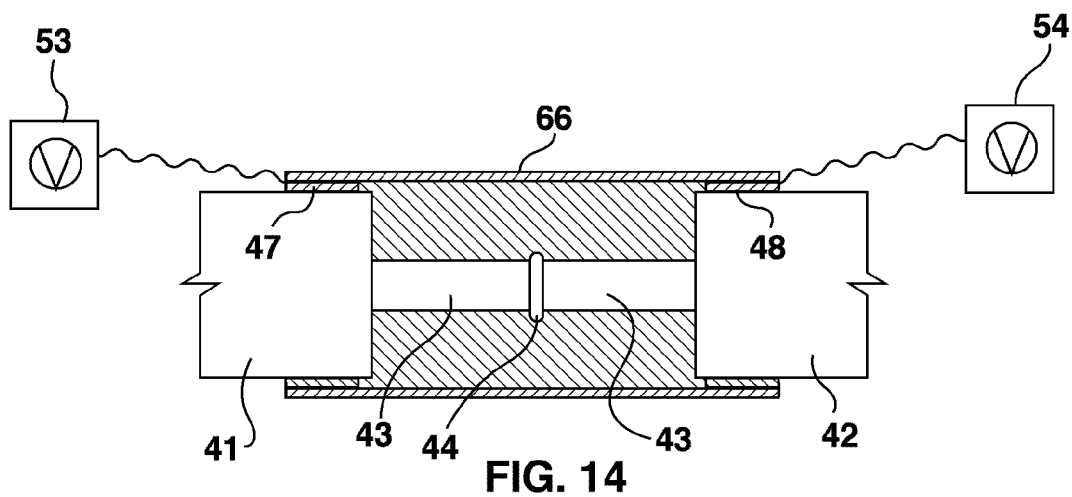

FIGS. 12 to 14 illustrate a further form in which a cylindrical foam body 64 is preformed on the pipe joint by, for example, introducing a foam precursor into a cylindrical mold (not shown), which is removed after the foam has formed and cured. A casing member 66, typically as described above with reference to FIGS. 1 and 2, is applied over electrically heatable members 47 and 48, for example as described above with reference to FIGS. 5 to 7. The casing 66 is shrunk down along it entire width, for example employing heat from a torch 52, as seen in FIG. 13, and then the members 47 and 48 are energized using power sources 53 and 54, as described above with reference to FIG. 7.

Where the casing member 10 as shown in FIG. 1 is used, where the first and second layers are shrinkable, the shrink response is faster. Since the second layer is non-crosslinked, or is less crosslinked than the first layer, it can be readily fusion bonded to the pipe jacket. Since the first and optionally the second layers are heat shrinkable, it or both impart hoop stress at the interface between the casing member and the typically polyethylene pipe jacket to facilitate a fusion bond.

Where the casing member 14 as shown in FIG. 2 is used, there is the advantage that because of the reduced thickness in the middle portion, the casing shrinks down faster, approximately twice as fast as the casing member 10, when exposed to similar heat flux.

Figure 11:
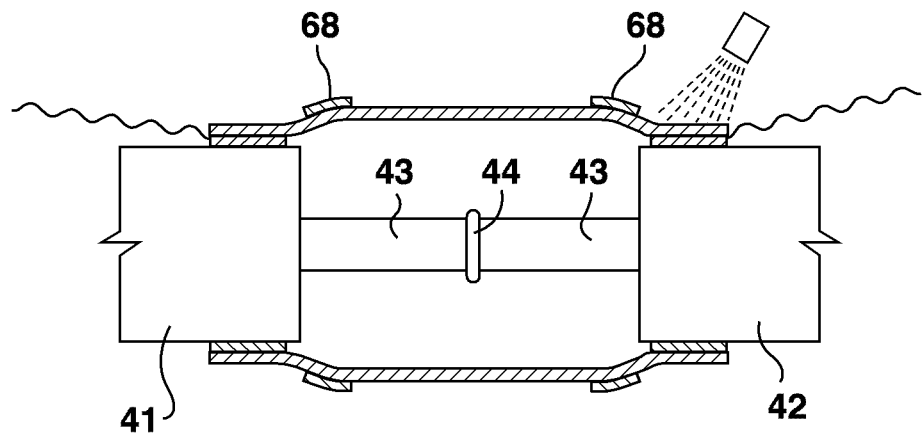

In the procedures described with reference to FIGS. 5 to 9, where the thickness of the casing member is uniform along its width, as with the member 10 of FIG. 1, or, where, as seen with reference to FIG. 2, is smaller in the middle portion, there is a risk that the casing member 10 or 14 may shrink into the joint cavity in the heat shrinking step described with reference to FIGS. 6 and 11. To avoid risk of such shrinking, glass fibre shield bands 68, as seen in FIGS. 5 and 11, may be wrapped adjacent the side zones protecting the casing from the heat and reducing the rink of the casing shrinking into the cavity.

Where the casing member 22 as seen in FIGS. 3 and 4 is used, there is preferential shrinking of the side portions of the casing member, because of reduced thickness, and little or no risk of shrinking of the casing member 22 into the joint cavity. There is fast shrinking time for the thinner side zones. The second layer side portions 24 overlapping on the pipe jacket (for example a polyethylene pipe jacket) of the insulated pipe is non-crosslinked, or is crosslinked to a degree substantially less than layer 23, and therefore can be readily fusion bonded to the pipe jacket. Since the first and optionally the second layers are heat shrinkable, it or both impart hoop stress at the interface between the casing member and the pipe jacket, to facilitate a fusion bond.

Where desired, tension straps 72, as seen in FIGS. 7 and 8 may be applied around the casing member 46 before foam-filling to avoid risk of excessive expansion or ballooning of the casing member 46.

Details of preferred procedures for casing application and foam filling are described in more detail in commonly assigned Canadian Patent Application No. 2,647,972 filed Dec. 19, 2008, the disclosure of which is incorporated herein by reference.

It will be noted in the above-described structures, at each side of the casing, the electrically heatable members are spaced away from and out of contact with the first layer and are disposed for heating the second layer. Where multiple electrically heatable members are present, all electrically heatable members are spaced away from and out of contact with the or each first layer, and are disposed for heating the second layer.

With the casing members described above with reference to the accompanying drawings, the first layer, and the second layer where heat shrinkable, cause the sides of the casing member to conform tightly to the jacket of the pipe sections or other tubular sections when heat shrunk, avoiding problems of impaired bonding as a result of non-concentricity of the members and sections.

The invention claimed is:

1. A casing member for forming a connection between two tubular sections, the casing member having at each side a side portion for connecting on a respective adjacent end surface of a tubular section adjacent the connection, and a middle portion that spans between the end surfaces of the tubular sections, each said side portion comprising a first crosslinked plastics material layer to be disposed relative to said end surfaces outwardly from a second plastics material layer that is uncrosslinked or has a degree of crosslinking substantially less than said first layer, at least said first layer being heat shrinkable in the direction of the circumference of the adjacent tubular section, and an electrically heatable member spaced inwardly from said first layer for heating the second layer to cause it to fusion bond with a plastics material jacket of a tubular section when disposed adjacent thereto, wherein the first crosslinked plastics material layer and the second plastics material layer comprise high density polyethylene.

2. A casing member according to claim 1, wherein the member spans continuously between the two tubular sections and the middle portion is formed integrally with the side portions.

3. A casing member according to claim 1 wherein the first layer extends substantially the full width of the casing member.

4. A casing member according to claim 1 wherein said second layer comprises portions extending adjacent the sides of the casing and the middle portion of the casing member is free from said second layer.

5. A casing member according to claim 1 wherein said second layer extends substantially the full width of the casing member.

6. A casing member according to claim 1 wherein said second layer is heat shrinkable.

7. The casing member according to claim 1 wherein the electrically heatable member is adapted to be disposed inwardly from the second layer.

8. The casing member according to claim 1 wherein the electrically heatable member is embedded integrally within the second layer.

9. The casing member according to claim 1 wherein the electrically heatable member comprises electrically resistively heatable elements.

10. The casing member according to claim 1 wherein the electrically heatable member comprises electrically inductively heatable elements.

11. The casing member according to claim 1 having a wall thickness at its thickest wall portion before heat shrinking of 2 to 15 mm.

12. A casing member according to claim 1, having a wall thickness at its thickest wall portion before heat shrinking of 8 to 25 mm.

13. Use of a casing member according to claim 1 for forming a connection between tubular sections including the steps of applying a heat source external of the casing member to heat shrink said first layer to conform said second layer tightly to an adjacent end surface of a tubular section under compressive hoop stress generated at least in part by the heat shrunk first layer, and heating the second layer to cause fusion bonding thereof to the end surface of the tubular section by electrically activating said electrically heatable member.

14. The casing member according to claim 1 wherein the second plastics material layer is crosslinked, and has a degree of crosslinking substantially less than said first layer.

15. A casing member according to claim 1 including a third layer of plastics material at least partially co-extensive with the middle portion.

16. A casing member according to claim 15 wherein the third layer is disposed inwardly from the second layer.

17. A casing member according to claim 15 wherein the third layer is heat shrinkable.

18. A casing member according to claim 1 in the form of a wrap-around sleeve comprising a sheet of which at least a portion is heat shrinkable along a heat shrink direction and that is, or of which sections are, adapted to be formed into a tubular sleeve by connecting together edges opposed in the heat shrink direction.

19. A casing member according to claim 18 wherein said sheet comprises a crosslinked heat shrinkable first plastics material layer and laminated thereto a second plastics material layer that is non-crosslinked or substantially less crosslinked than the first layer.

* * * * *